United States Patent [19]

Fettweis

[11] Patent Number: 5,442,580

[45] Date of Patent: Aug. 15, 1995

[54] PARALLEL PROCESSING CIRCUIT AND A DIGITAL SIGNAL PROCESSER INCLUDING SAME

[75] Inventor: Gerhard P. Fettweis, Berkeley, Calif.

[73] Assignee: TCSI Corporation, Berkeley, Calif.

[21] Appl. No.: 248,765

[22] Filed: May 25, 1994

[51] Int. Cl.$^6$ .............................................. G06F 7/38
[52] U.S. Cl. ............................................... 364/736
[58] Field of Search ..................................... 364/736

[56] References Cited

U.S. PATENT DOCUMENTS

| | | | |
|---|---|---|---|
| 5,175,702 | 12/1992 | Beraud et al. | 364/736 |
| 5,278,781 | 1/1994 | Aono et al. | 364/736 |
| 5,297,071 | 3/1994 | Sugino | 364/736 |
| 5,301,340 | 4/1994 | Cook | 364/736 |

Primary Examiner—Tan V. Mai
Attorney, Agent, or Firm—Ronald L. Yin; Limbach & Limbach

[57] ABSTRACT

A parallel processing circuit and a digital signal processor employing such a parallel circuit employs a plurality of identical multiply and accumulate (MAC) processing units. Two input signals are supplied to each of the MAC processing units. In one embodiment, a delay or a shift register delays one of the input digital signal from one MAC to another MAC. A plurality of different processed signals can be generated simultaneously based upon the supplied input digital signals, greatly increasing processing capability without increasing clock speed or increasing bandwidth access to a memory.

16 Claims, 3 Drawing Sheets

PARALLEL PROCESSING CIRCUIT AND A DIGITAL SIGNAL PROCESSER INCLUDING SAME

TECHNICAL INVENTION

The present invention relates to a parallel processing circuit which receives two input digital signals and can generate simultaneously a plurality of processed signals. More particularly, the present invention relates to a digital signal processor having a parallel processing circuit such that a plurality of processed signals can be generated simultaneously based upon two input digital signals fetched in at most two fetch cycles from a memory.

BACKGROUND OF THE INVENTION

Digital signal processors (DSPs) are well known in the art. DSPs are used for executing algorithms which in general have a "high content" of numerical operations. Examples of numerical operations include multiply, divide and accumulate (repeated summing). DSPs are used to process electrical signals using these "numerical operations" in, for example, communications as well as video processing applications.

A DSP is like a microprocessor in that it has a fetch unit which generates an address signal which is supplied to a memory the memory may be internal to the DSP chip or may be external thereto. The memory responds by supplying data signal along a data bus back to the DSP. The DSP then operates upon that data signal from the memory and can then store it back in the memory based upon the address generated by its fetch unit.

To increase the processing power of a DSP, prior an has suggested two approaches. The first approach is to simply increase the clock rate. However, increasing the clock rate or its frequency typically leads to high power consumption due to the oversize clock and logic drivers. Another prior art solution is to introduce some degree of parallel processing, such as pipeline processing. However, in pipeline processing, there is a limitation in that the signals operated thereon are not really operated upon simultaneously. They only to be operated upon simultaneously. In a typical pipeline operation, for example, if an operation required 4 clock cycles, a pipeline operation would start a first operation. After a delay of one clock cycle, i.e. without waiting for the complete processing of the first operation, a second operation is started. In this manner, once the pipeline is set up, four operations can be accomplished in four cycles. Pipeline has a drawback in that if a branch instruction should occur then the pipeline must be set up again before it can be processed. Other prior art techniques have included the use of multiple instances of processing data paths. This, however, leads to an input/output problem in that multiple data paths means that multiple data ports must be provided simultaneously. This requires high bandwidth memory access. Examples of prior art DSPs with pipeline operation include the TMS 320C25 or 320C5x, or 320C80, all available from Texas Instruments.

Hence, it is one object of the present invention to increase the parallel processing capability of a circuit and more particularly to a DSP incorporating such a circuit without the aforementioned drawbacks.

SUMMARY OF THE INVENTION

A parallel processing receives a first and a second digital signal and generates simultaneously a plurality of processed signals. The circuit comprises a plurality of substantially identical processing means with each of the processing means having two inputs for receiving two input digital signals and for generating a processed signal. Each processing means generates a multiply and accumulate operation of the two supplied input digital signals. A first digital signal is supplied simultaneously to a first input of all of the plurality of processing means. A second digital signal is supplied to a second input of a first processing means.

A DSP incorporating such a parallel processing circuit is also disclosed.

DETAILED DESCRIPTION OF THE DRAWINGS

Figure 1:
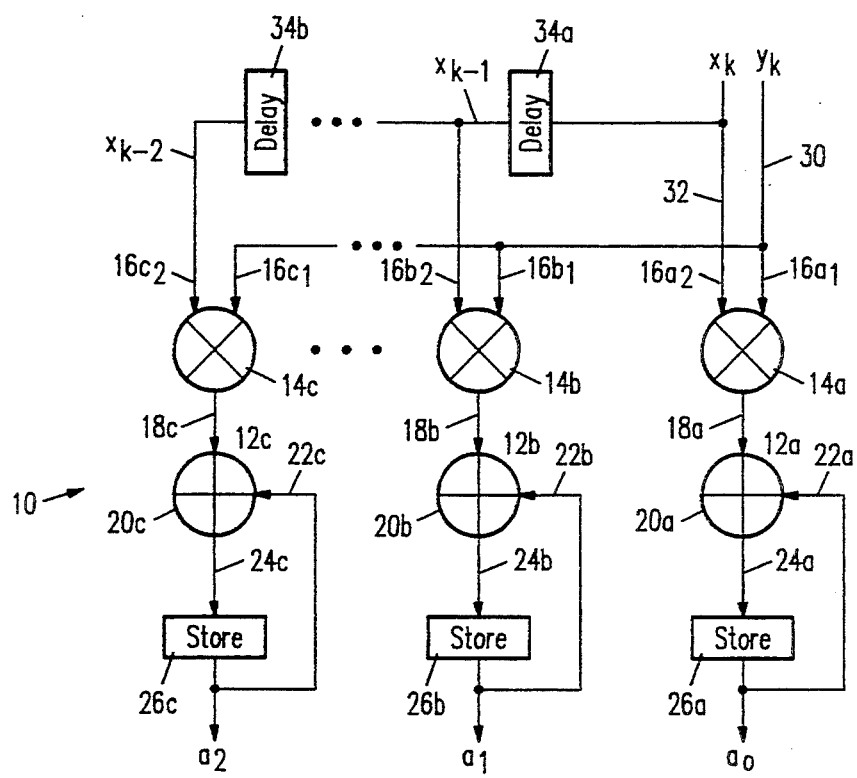
FIG. 1 is a block level schematic diagram of one embodiment of a parallel processing circuit of the present invention.

Referring to FIG. 1 there is shown a parallel processing circuit 10 of the present invention. The circuit 10 comprises a plurality of substantially identical processing means 12(a–c) (although only three are shown, the invention is not so limited). Each of the processing means 12x (where x is a, b, or c) comprises a multiplier 14x which has two inputs 16x1 and 16x2 for receiving two input digital signals. Each of the multipliers 14x generates a multiplied signal 18x which is a multiplication of the input digital signals supplied on the inputs 16x1 and 16x2. The multiplied signal 18x is supplied to an adder 20x. The adder 20x also receives a stored signal 22x and generates an accumulate signal 24x which is the sum of the multiplied signal 18x and the stored signal 22x. The accumulate signal 24x is supplied to a storage 26x. The output of each of the storage 26x is the stored signal 22x and is both supplied back to the adder 20x as well as being the output of each of the processing means 12x.

The parallel processing circuit 10 receives a first digital signal $Y_k$ and a second digital signal $X_k$. The first and second digital signals $Y_k$ and $X_k$ are supplied simultaneously at every clock cycle. The circuit 10 also comprises a first wire or signal distributions means 30 for distributing the first digital signal $Y_k$ to the first input 16x1 of each of the processing means 12x. In addition, the circuit 10 has a second wire or signal distribution means 32 which receives the second digital signal $X_k$ and supplies it to the second input 16a2 of the first processing means 12a. The second signal distribution means 32 also supplies the second digital signal $X_k$ to a first delay 34a. The first delay 34a delays the second digital signal $X_k$ by one clock cycle. In the preferred embodiment, the first delay 34a is a shift register. The output of a first delay 34a is a one cycle delayed second digital signal $X_{k-1}$. The once delayed second digital signal $X_{k-1}$ is supplied to the second input 16b2 of the second processing means 12b. The once delayed second digital signal $X_{k-1}$ is then supplied to a second delay 34b which delays it by yet another clock cycle. The output of the second delay 34b is a twice delayed second digital signal $X_{k-2}$ which is supplied to the second input 16c2 of the third processing means 12c. In this manner, between each successive processing means 12, the second digital signal is delayed by one clock cycle.

From the foregoing, it can be seen that the output signals $A_0$ (which is the stored signal 22a from processing means 12a ) and $A_1$ (which is the stored signal 22b from the processing means 12b ) and the $A_2$ (which is the stored signal 22c from the processing means 12c ) are generated simultaneously. These output signals $A_0$, $A_1$ and $A_2$ represent the operation upon the input signals $Y_k$ and $X_k$ as follows:

$$A_0 = \sum_{K=0}^{N-1} X_k Y_k$$

$$A_1 = \sum_{K=0}^{N-1} X_{k-1} Y_k$$

$$A_2 = \sum_{K=0}^{N-1} X_{k-2} Y_k$$

As can be seen, these are the simultaneous results of the operation $$A_m = \sum_{K=0}^{N-1} X_{k-m} Y_k$$

on the input signals $X_k$ and $Y_k$, and represents the operation of a finite impulse response filtering thereof.

The simultaneous results can be obtained as follows:

| | Input(I)/Output(O) Signals to Processor | | | | | |
|---|---|---|---|---|---|---|
| | 12c | | 12b | | 12a | |
| Cycle | (I) | (O) | (I) | (O) | (I) | (O) |
| 0 | (—, $Y_k$) | (—) | (—, $Y_k$) | (—) | ($X_k$, $Y_k$) | $X_k Y_k$ |
| 1 | (—, $Y_{k+1}$) | (—) | ($X_k$, $Y_{k+1}$) | $X_k Y_{k+1}$ | ($X_{k+1}$, $Y_{k+1}$) | $X_k Y_k + X_{k+1} Y_{k+1}$ |
| 2 | ($X_k$, $Y_{k+2}$) | $X_k Y_{k+2}$ | ($X_{k+1}$, $Y_{k+2}$) | $X_k Y_{k+1} + X_{k+1} Y_{k+2}$ | ($X_{k+2}$, $Y_{k+2}$) | $X_k Y_k + X_{k+1} Y_{k+1} + X_{k+2} Y_{k+2}$ |

Of course either signal $X_k$ or $Y_k$ can be delayed.

Figure 2:
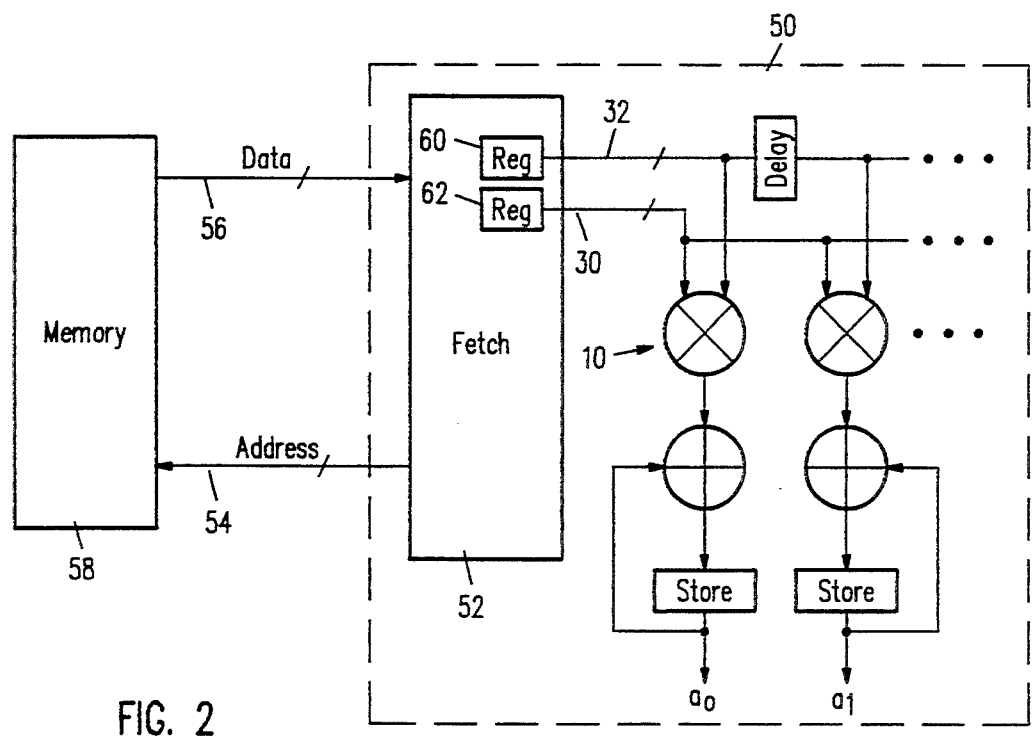
FIG. 2 is a block level schematic diagram of one embodiment of a digital signal processor incorporating the embodiment of the parallel processing circuit shown in FIG. 1.

Referring to FIG. 2, them is shown a digital signal processor 50 using the parallel processing circuit 10 shown in FIG. 1. As is well known, a digital signal processor 50 has a fetch unit 52, which can generate address signals supplied on an address bus 54 and can receive or supply data signals on a data bus 56. The address bus 54 and the data bus 56 are connected to a memory 58. The memory 58 may be internal or external to the digital signal processor 50. In response to an address signal on the address bus 54, the fetch unit 52 can receive data from the memory 58 supplied along the data bus 56 into the fetch unit 52. The data fetched by the digital signal processor 50 in one or more of fetch cycles, can be stored in internal register 60 and 62. Thus, the first digital signal $Y_k$ can be stored in register 62 while the second digital signal $X_k$ can be stored in register 60. Typically, the digital signal processor 50 fetches data signals from the memory 58 in clock cycles. Therefore, in the event the first and second digital signals $Y_k$ and $X_k$ are required to be fetched in two clock cycles, for each two fetched cycles, employing the parallel processing circuit 10 of the present invention shown in FIG. 1, the DSP 50 can generate the processed signals $A_0$, $A_1$, and $A_2$, simultaneously.

As can be seen from the foregoing, one application of the parallel processing circuit 10 is in finite pulse response (FIR) filtering operations. In performing such an operation, it can be seen that with the parallel processing circuit 10 of the present invention used in the DSP 50, two simultaneous outputs to the FIR filtering operation can be executed simultaneously, greatly increasing the throughput of the DSP 50. Similarly, an inverse/impulse response (IIR) filter can be described by $$A_m = \sum_{K=0}^{N} X_{k-m} Y_k + Z_m$$

Again, a plurality of operations for the IIR filtering can be performed simultaneously and in parallel.

$$A_0 = \sum_{K=0}^{N} X_k Y_k + Z_0$$

$$A_1 = \sum_{K=0}^{N} X_{k-1} Y_k + Z_1$$

$$A_2 = \sum_{K=0}^{N} X_{k-2} Y_k Z_2$$

Finally, a correlation $C_i(X,Y)$ between two vectors $X_k$ and $Y_k$ can also be calculated using the DSP 50 with the parallel processing circuit 10. The correlation operation is performed as follows:

$$C_i(X,Y) = \sum_{K=1}^{N} X_{k+i} Y_k$$

Figure 3:
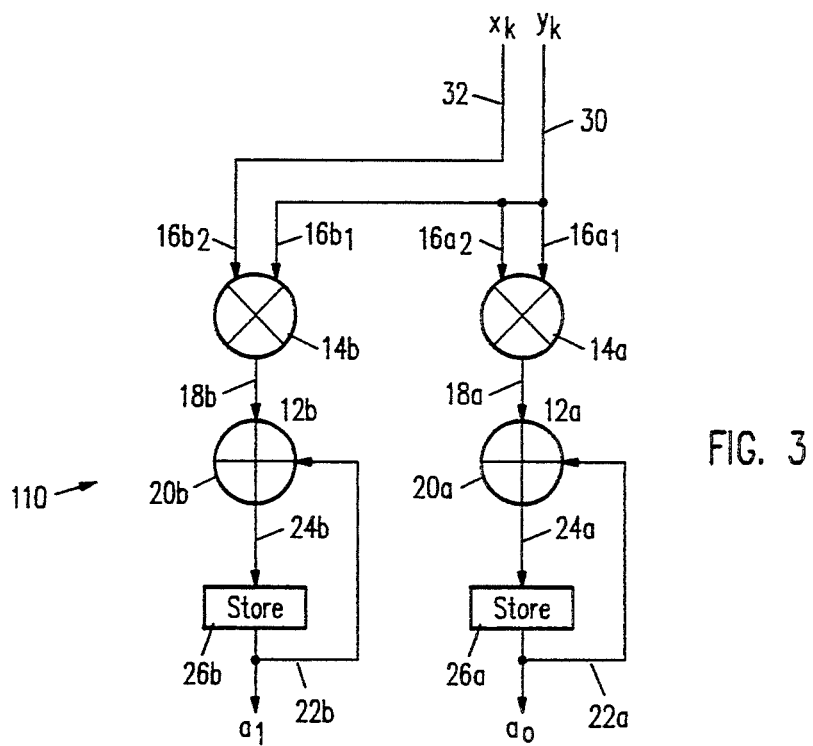
FIG. 3 is a block level schematic diagram of another embodiment of a parallel processing circuit of the present invention.

Clearly, parallel operations of $C_i(X,Y)$ and $C_{i+1}(X,Y)$ can be carried out simultaneously with the parallel processing circuit 10 and the DSP 50. Referring to FIG. 3, there is shown another embodiment of a parallel processing circuit 110 of the present invention. The parallel processing circuit 110 comprises a plurality of processing means 12(a-b), each of which is identical to the processing means 12 shown in FIG. 1. Thus, each of the processing means 12x comprises a multiplier 14x having two inputs 16x1 and 16x2 for receiving two input digital signals and for generating a multiplied digital signal 18x.

The multiplied digital signal 18x is supplied to an adder 20x which also receives a stored signal 22x. The output of the adder 20x is an accumulate signal 24x which is supplied to a storage register 26x. The output of the storage register 26x is the processed signal of the processing means 12x and is also supplied back to the adder 20x as the stored signal 22x.

Again, similar to the embodiment shown in FIG. 1, although only two processing means 12 are shown, clearly the parallel processing circuit 110 is not limited to the use of only two processing means 12.

The parallel processing circuit 110 also comprises wires or signal distributing means 30 which receives a first digital signal $Y_k$ and supplies it to the first input signal 16x1 of each of the processing means 12x. In addition, the signal distributing means 30 supplies the first digital signal $Y_k$ to the second input 16a2 of the first processing means 12a. The parallel processing circuit 110 also comprises a second wire or second signal distributing means 32, which receives the second digital signal $X_k$ and supplies it to the second input 16b2 of the second processing means 12b.

In the operation of the parallel processing circuit 110, the processed signal, $A_0$ and $A_1$, which are outputs of each of the processing means 12a and 12b respectively, are the outputs of the processing on the supplied input signals $X_k$ and $Y_k$ in the following manner.

$$A_0 = \sum_{K=1}^{N} Y_k^2$$

$$A_1 = \sum_{K=1}^{N} X_k Y_k$$

Thus, the processed signals $A_0$ and $A_1$ are provided simultaneously at each clock cycle based upon the supplied input digital signals $Y_k$ and $X_k$.

For many operations, such as vector quantization, the squared distance $d(X,Y)$ between two vectors $X_k$ and $Y_k$ can be computed as $$d(X,Y) = \sum_{K=1}^{N} (X_k - Y_k)^2$$

This can be modified to an expression to which $$d(X,Y) = \sum_{K=1}^{N} -2Y_k X_k + Y_k^2$$

must be computed. Through an appropriate multiplier, this becomes $$d(X,Y) = A_1 + A_0$$

Figure 4:
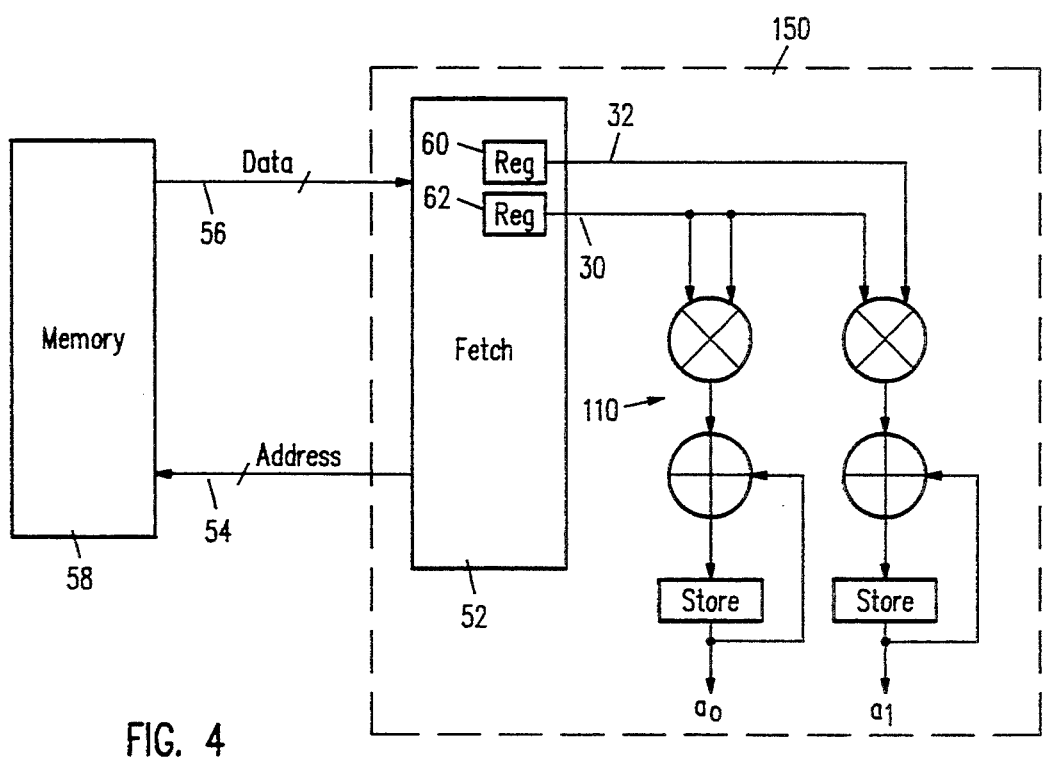
FIG. 4 is a block level schematic diagram of another embodiment of a digital signal processor incorporating the embodiment of the parallel processing circuit shown in FIG. 3.

Referring to FIG. 4 there is shown a digital signal processor 150 using the parallel processing circuit 110. Similar to the digital signal processor 50 shown in FIG. 2, the digital signal processor 150 comprises a fetch unit 52 which can supply an address signal on an address bus 54 which is connected to a memory 58. In response to the address signal supplied on the address bus 54, the memory 58 can supply data signals to a data bus 56 back to the fetch unit 52. The fetch unit 52 also has associated registers 60 and 62 to store the fetched input signals $X_k$ and $Y_k$ respectively. These signals are then supplied to the parallel processing circuit 110, as described heretofore.

Similar to the description for the digital signal processor 50, the digital signal processor 150 fetches the input digital signals $X_k$ and $Y_k$ from the memory 58 in at most two fetch cycles. The fetched signals $Y_k$ and $X_k$ are stored in the registers 62 and 60 respectively and then are supplied to the parallel processing circuit 110, simultaneously. For a time duration of at most two fetch cycles, a plurality of processed signals $A_0$ and $A_1$ are generated simultaneously.

Similar to the embodiment of the DSP 50 shown in FIG. 2, the DSP 150 can operate on the signals $X_k$ and $Y_k$ to generate the squared distance $d(X,Y)$ operation using at most two memory read operations.

Figure 5:
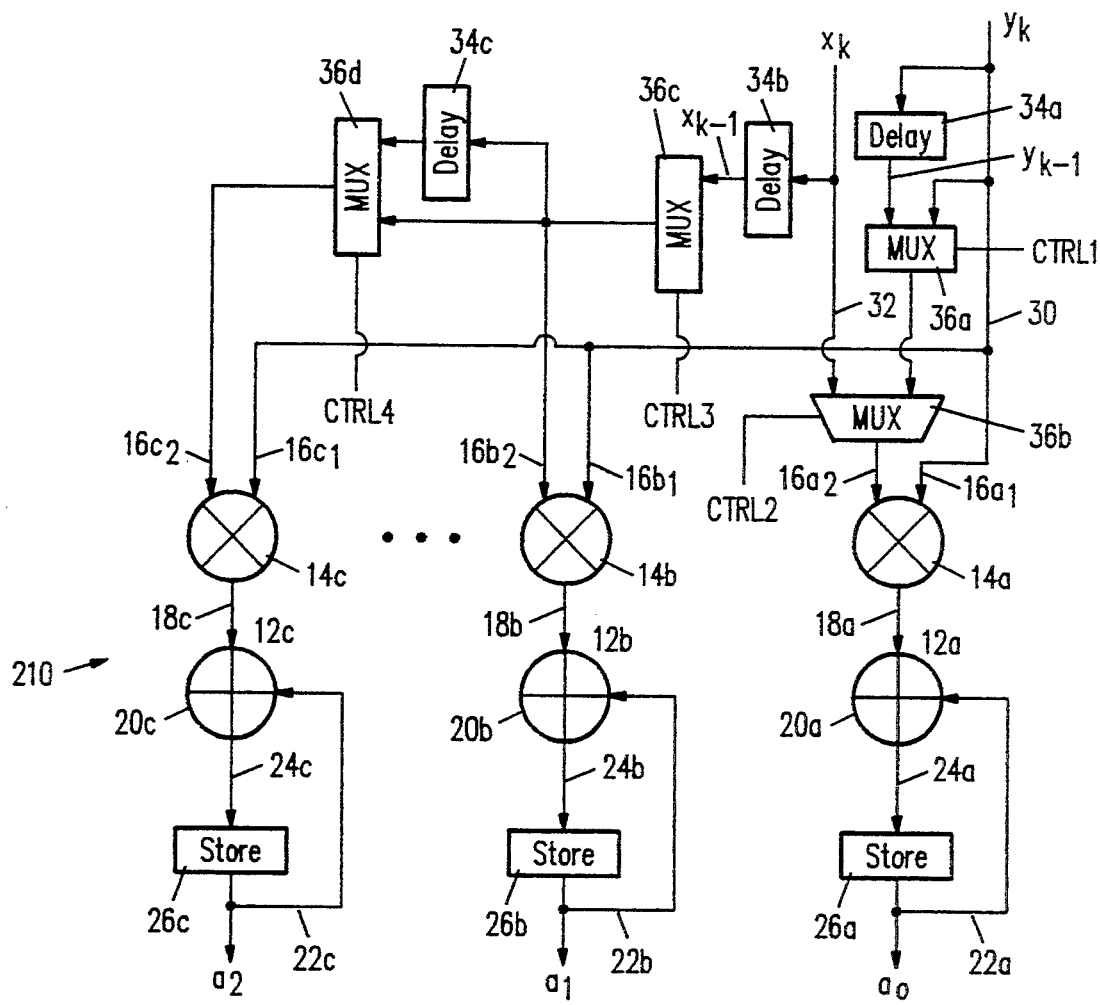
FIG. 5 is a block level schematic diagram of yet another embodiment of a generalized parallel processing circuit of the present invention from which the embodiments in FIGS. 1 and 3 can be derived.

Referring to FIG. 5 there is shown another embodiment of a parallel processing circuit 210. The parallel processing circuit 210 like the parallel processing circuit 110 and parallel processing circuit 10 comprises a plurality of identical processing means 12(a-c), each of which is identical to the processing means 12 shown in FIG. 3 and FIG. 1. Thus, each of the processing means 12x comprises a multiplier 14x having two inputs 16x1 and 16x2 and generates a multiplied signal 18x in response thereto. The multiply signal 18x is supplied to an adder 20x which also receives a stored signal 22x. The adder 20x sums the multiply signal 18x with the stored signal 20 x and generates an accumulate signal 24x which is stored in a storage register 26x. The output of the storage register 26x is supplied back to the adder 20x as the stored signal 22x and is also supplied as the output of each of the processing means 12x.

The parallel processing circuit 210 also comprises a first signal distributing means 30 comprising wires which receives a first input digital signal $Y_k$ and supplies it to the first input 16x1 of each of the processing means 12x. In addition, the input digital signal $Y_k$ is supplied to a first delay 34a, which in the preferred embodiment is a shift register and is similar to that which is disclosed in FIG. 1. The output of the first delay 34a is a once delayed first input digital signal $Y_{k-1}$, which is supplied to a first multiplexer 36a. The first input digital signal $Y_k$ is another input to the first multiplexer 36a. The output of the first multiplexer 36a is supplied to a second multiplexer 36b. The parallel processing circuit 210 also comprises a second signal distributing means 32 for receiving a second input digital signal $X_k$ and for distributing it to the various inputs of the various processing means 12. The second input digital signal $X_k$ is supplied along the second signal distributing means 32 as another input to the second multiplexer 36b. The output of the second multiplexer 36b is supplied as an input to the second input 16a2 of the first processing means 12a.

The second input digital signal $X_k$ is also supplied to a second delay 34b, whose output is supplied to a third multiplexer 36c. In addition, the second input digital signal $X_k$ is also supplied directly to the third multiplexer 36c. The output of the third multiplexer 36c is supplied to the second input 16b2 of the second processing means 12b.

In addition, the output of the of the third multiplexer 36c is supplied to a third delay 34c which produces a twice delayed second input digital signal which is supplied to a fourth multiplexer 36d. In addition, the output of the third multiplexer 36c is also supplied directly to the fourth multiplexer 36d. The output of the fourth multiplexer 36d is supplied to the second input 16c2 of the third processing means 12c.

Each of the first, second, third and fourth multiplexers 36a, b, c and d, respectively is controlled by a control signal CTRL1, CTRL2, CTRL3, and CTRL4, respectively.

From the foregoing, it can be seen that depending upon the state of the control signals CTRL(1–4), the parallel processing circuit 210 can generate the following processed signals $A_0$, $A_1$ and $A_2$.

| Case | $A_0$ | $A_1$ | $A_2$ |
|------|-------|-------|-------|
| 1 | $Y_k Y_k$ | $Y_k X_k$ | $Y_k X_{k-1}$ |
| 2 | $Y_k Y_k$ | $Y_k X_{k-1}$ | $Y_k X_{k-2}$ |
| 3 | $Y_k Y_{k-1}$ | $Y_k X_k$ | $Y_k X_{k-1}$ |
| 4 | $Y_k Y_{k-1}$ | $Y_k X_{k-1}$ | $Y_k X_{k-2}$ |
| 5 | $Y_k X_k$ | $Y_k X_{k-1}$ | $Y_k X_{k-2}$ |

Cases 1 and 5 are the embodiments shown in FIGS. 3 and 1 respectively. Cases 2 and 4 are the same as Cases 1 and 3 respectively. Finally, case 3 is another potential embodiment.

From the foregoing, it can be seen that there am many advantages to the parallel processing circuit and the digital signal processor employing such a parallel processing circuit of the present invention. Without the need to increase bandwidth access to a memory, with the parallel processing circuit involving a plurality of substantially identical multiply and accumulate processing circuits, a number of processed signals can be generated simultaneously based upon a limited number of signals fetched from the memory. This greatly increases throughput without requiring an increase in clock speed or increase in bandwidth access to a memory. In addition, although the preferred embodiment discloses each of the processing circuits as operating on the input signals to provide an output signal which is a multiply and accumulate signal thereof, the invention can be extended to any circuit operating on the input signals in any type of arithmetic operation.

What is claimed:

1. A parallel processing circuit for receiving a first digital signal and a second digital signal and for generating a plurality of processed signals, said circuit comprising:
   a plurality of substantially identical processing means each having two inputs for receiving two input digital signals and for generating a processed signal, wherein said processed signal is an arithmetic operation of said two input digital signals;
   means for supplying said first digital signal simultaneously to a first input of all of said plurality of processing means;
   means for supplying said first digital signal to a first delay means and for generating a first delayed digital signal therefrom;
   first multiplexer means for receiving said first delayed digital signal and said first digital signal and a first control signal for generating a first multiplexed signal in response thereto, wherein said first multiplexed signal being either said first delayed digital signal or said first digital signal in response to said first control signal;
   second multiplexer means for receiving said first multiplexed signal and said second digital signal and a second control signal for generating a second multiplexed signal in response thereto, wherein said second multiplexed signal being either said first multiplexed signal or said second digital signal in response to said second control signal;
   means for supplying said second multiplexed signal to a second input of one of said plurality of processing means;
   second delay means for receiving said second digital signal and for generating a second delayed digital signal in response thereto;
   third multiplexer means for receiving said second delayed digital signal and said second digital signal and a third control signal for generating a third multiplexed signal in response thereto, wherein said third multiplexed signal being either said second delayed digital signal or said second digital signal in response to said third control signal; and
   means for supplying said third multiplexed signal to a second input of another of said plurality of processing means.

2. The circuit of claim 1 wherein said arithmetic operation is a multiply and accumulate operation.

3. The circuit of claim 2 wherein each of said processing means further comprising:
   means for multiplying said two input digital signals to generate a multiplied signal;
   means for adding said multiplied signal to a stored signal to generate an accumulate signal;
   means for storing said accumulate signal; and
   means for supplying said accumulate signal stored in said storing means to said adding means as said stored signal, and to supply said accumulate signal stored in said storing means as said processed signal.

4. The circuit of claim 2 wherein said first and second digital signals are supplied at each clock cycle and said plurality of processed signals are generated at each of said clock cycles.

5. The circuit of claim 4 comprising:
   wherein said second delay means delays said second digital signal by one clock cycle.

6. The circuit of claim 4 wherein said first delay means delays said first digital signal by one clock cycle.

7. The circuit of claim 6 wherein said first delay means comprises a shift register.

8. The circuit of claim 7 wherein each of said processing means further comprising:
   means for multiplying said two input digital signals to generate a multiplied signal;
   means for adding said multiplied signal to a stored signal to generate an accumulate signal;
   means for storing said accumulate signal; and
   means for supplying said accumulate signal stored in said storing means to said adding means as said stored signal, and to supply said accumulate signal stored in said storing means as said processed signal.

9. A digital signal processor comprising:
   means for fetching from a memory means, a first and a second digital signal;
   a plurality of substantially identical processing means each having two inputs for receiving two input digital signals and for generating a processed signal, wherein said processed signal is an arithmetic operation of said two input digital signals;
   means for supplying said first digital signal simultaneously to a first input of all of said plurality of processing means;
   means for supplying said first digital signal to a first delay means and for generating a first delayed digital signal therefrom;

first multiplexer means for receiving said first delayed digital signal and said first digital signal and a first control signal for generating a first multiplexed signal in response thereto, wherein said first multiplexed signal being either said first delayed digital signal or said first digital signal in response to said first control signal;

second multiplexer means for receiving said first multiplexed signal and said second digital signal and a second control signal for generating a second multiplexed signal in response thereto, wherein said second multiplexed signal being either said first multiplexed signal or said second digital signal in response to said second control signal;

means for supplying said second multiplexed signal to a second input of one of said plurality of processing means;

second delay means for receiving said second digital signal and for generating a second delayed digital signal in response thereto;

third multiplexer means for receiving said second delayed digital signal and said second digital signal and a third control signal for generating a third multiplexed signal in response thereto, wherein said third multiplexed signal being either said second delayed digital signal or said second digital signal in response to said third control signal; and means for supplying said third multiplexed signal to a second input of another of said plurality of processing means.

10. The digital signal processor of claim 9 wherein each of said processing means is a multiply and accumulate (MAC) means, for receiving said two input digital signals and for generating a multiply and accumulate signal therefrom.

11. The digital signal processor of claim 10 wherein each of said MAC means further comprising:
means for multiplying said two input digital signals to generate a multiplied signal;
means for adding said multiplied signal to a stored signal to generate an accumulate signal;
means for storing said accumulate signal; and
means for supplying said accumulate signal stored in said storing means to said adding means as said stored signal, and to supply said accumulate signal stored in said storing means as said multiply and accumulate signal.

12. The digital signal processor of claim 10 wherein said fetched first and second digital signals are supplied at each clock cycle and said plurality of processed signals are generated at each of said clock cycles.

13. The digital signal processor of claim 12 wherein said first delay means delays said first digital signal by one clock cycle.

14. The digital signal processor of claim 13 wherein said second delay means delays said second digital signal by one clock cycle.

15. The digital signal processor of claim 14 wherein said second delay means is a shift register.

16. The digital signal processor of claim 13 wherein each of said MAC means further comprising:
means for multiplying said two input digital signals to generate a multiplied signal;
means for adding said multiplied signal to a stored signal to generate an accumulate signal;
means for storing said accumulate signal; and
means for supplying said accumulate signal stored in said storing means to said adding means as said stored signal, and to supply said accumulate signal stored in said storing means as said multiply and accumulate signal.

* * * * *